May 7, 1968 E. J. FIELD 3,382,411
ELECTRICAL DISTRIBUTION CIRCUITS EMPLOYING COMBINED SINGLE
PHASE AND THREE-PHASE SECTIONALIZING PROTECTION
Filed April 26, 1966 3 Sheets-Sheet 1
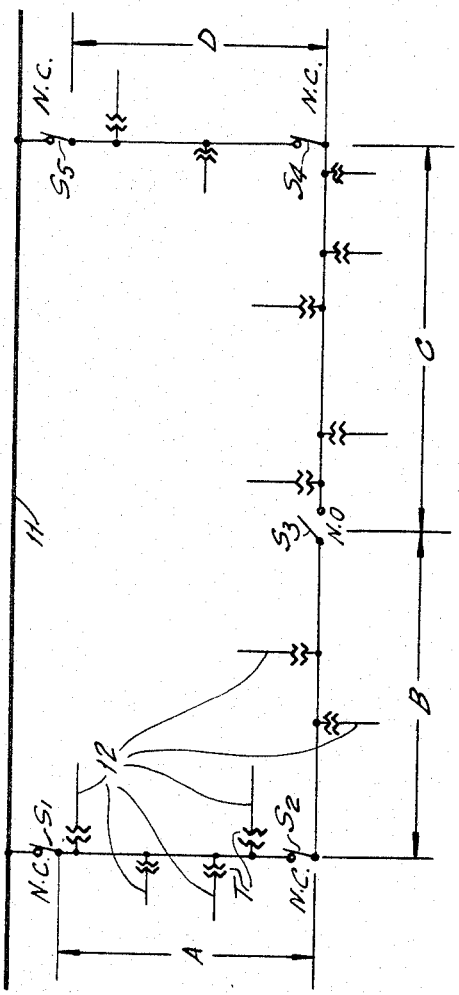
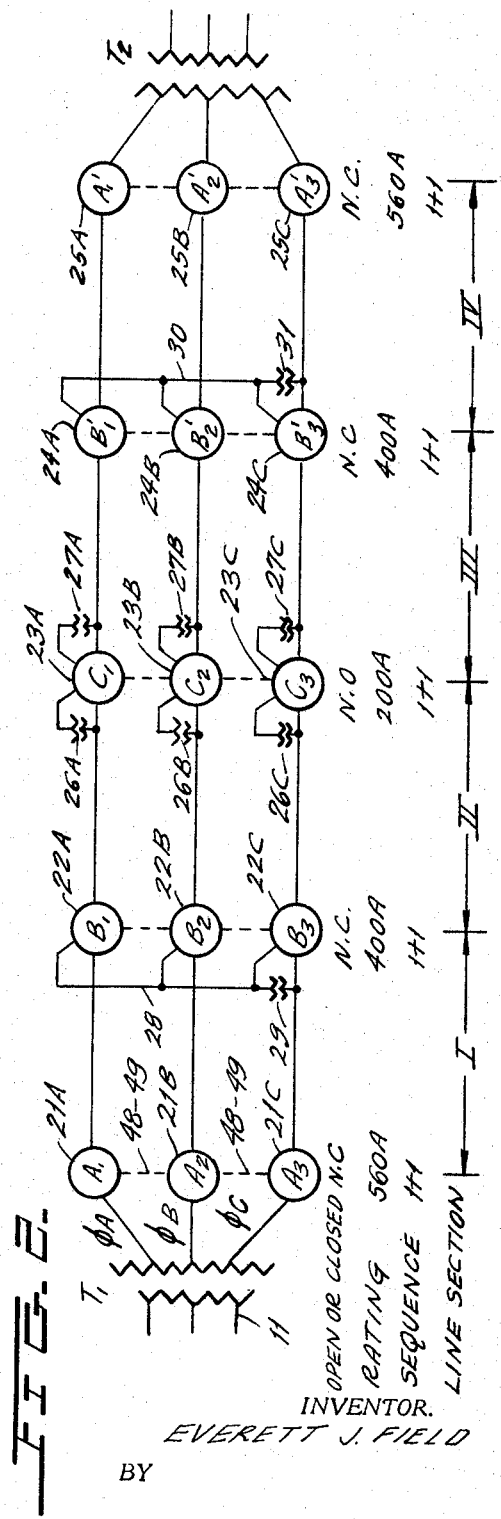
INVENTOR.
EVERETT J. FIELD
BY
OSTROLENK, FABER, GERB & SOFFEN
ATTORNEYS

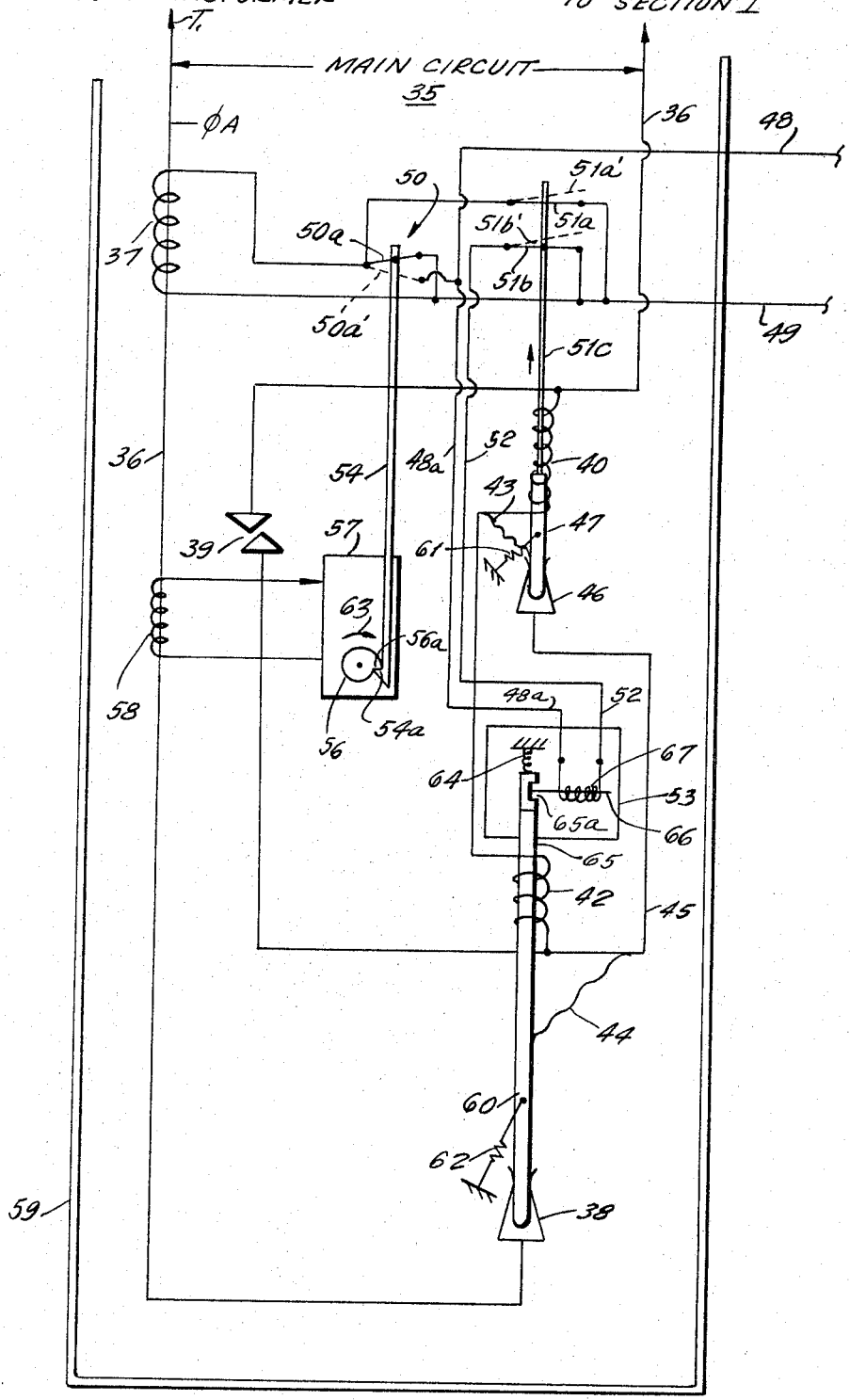

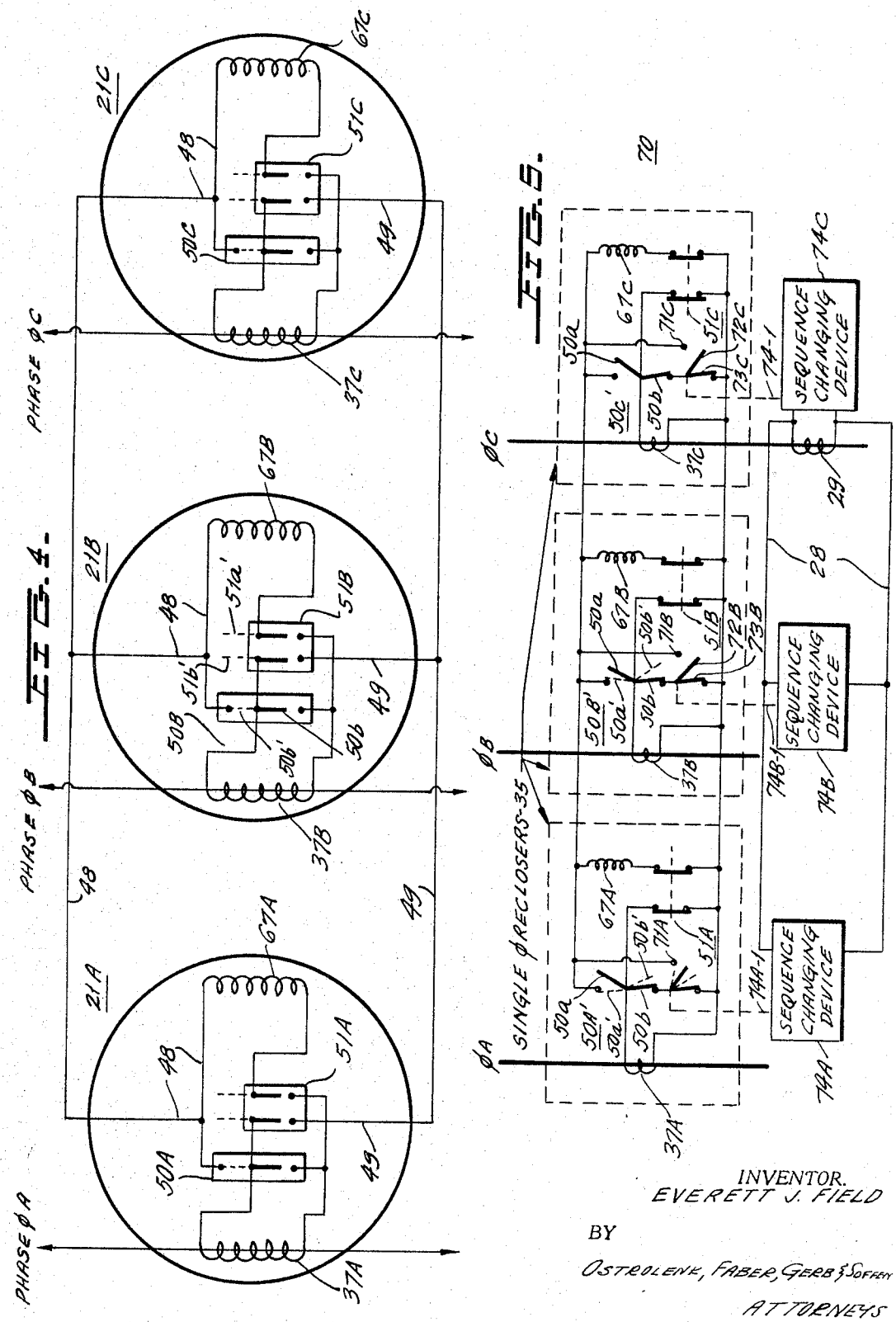

United States Patent Office 3,382,411
Patented May 7, 1968

3,382,411
ELECTRICAL DISTRIBUTION CIRCUITS EMPLOY-
ING COMBINED SINGLE PHASE AND THREE-
PHASE SECTIONALIZING PROTECTION
Everett J. Field, Jeannette, Pa., assignor to I-T-E
Circuit Breaker Company, Philadelphia, Pa., a cor-
poration of Pennsylvania
Filed Apr. 26, 1966, Ser. No. 545,325
8 Claims. (Cl. 317—25)

The instant invention relates to circuit protective de-
vices, and more particularly to circuit protective devices
of both the single phase and three-phase type which are
combined with control circuitry to provide circuit protec-
tion for power distribution networks, preferably of the
"open-loop" type.

Circuit protective devices of both the single phase and
three-phase type are well known in the art, each having
advantages distinguishable from the other. For example,
considering circuit interrupters of the reclosure type, such
single phase reclosures have the advantage of being able
to trip instantly upon the occurrence of a fault, remain
open for a brief period of time, and reclose thereafter so
as to cause only a very brief interruption in the single
phase circuit which is typically quite sufficitnt upon the
occurrence of transient fault conditions. In the case of
persistent or permanent faults, reclosers, of the three-
phase type interrupt the circuit for three phases so as to
prevent servere damage or destruction of the network, or
connected load.

In addition to providing both single phase and three-
phase interrupting protection, additional benefits of circuit
protection accrue to the user when the overall protective
system is capable of discriminating between fault occur-
ring in different sections of a loop circuit so as to cause
isolation of only a small segment of the total circuit within
which a permanent fault occurs. The equipment necessary
to accomplish automatic sectionalizing is complex and ex-
pensive. In certain forms, the equipment is limited in ap-
plication to networks of relatively low voltage magnitude.
The problem which, therefore, exists is that of devising
equipment and a system that will economically combine
the advantages of single phase and three-phase circuit pro-
tection, together with the benefits of automatic sectionaliz-
ing wherein the overall circuit combination is completely
compatible with, and reliable for use with presently ac-
cepted distribution circuit voltages, including as well, the
higher voltages adopted in recent years.

In order to achieve these lofty objectives through the
use of both practical and economical apparatus, I have
conceived of an open-loop network having its end points
coupled to a power line through suitable circuit inter-
rupter devices and having its midpoint normally open and
serviced by a tie recloser which is operative to close upon
the occurrence of certain overload conditions. The open-
loop is divided into a plurality of sections with the end
points of each section being connected to an adjacent
section by a suitable circuit interrupter device. During
normal operation, all of the feeder circuit interrupters are
closed and the tie recloser is open. Upon the occurrence of
a transient overload condition, i.e., a current surge, in any
one of the three phases, the circuit interrupter closest to
the location of the fault on the source side automatically
trips, stays open a predetermined time period, and re-
closes. If the fault has cleared after this operation cycle,
the open-loop remains in its normal state. Upon the oc-
currence of a permanent fault, the breaker or circuit inter-
rupter closest to the location of the fault automatically
trips, remains open for a predetermined time period, and
recloses. Since the fault is a persistent condition, the cir-
cuit breaker closest to the location of the fault, after re-
closing, automatically trips all three phases of the network
and goes to lockout, thus isolating power from all of the
sections located between the end of the line and the open
tie recloser in which the fault has occurred. The circuit
interrupter of the adjacent section which is equipped with
a sequence changing device senses the loss of power to the
section which it services so as to modify its operating se-
quence to automatically trip and lockout. The tie recloser,
in sensing a fault condition, closes across the open-loop
location.

After closure of the tie recloser, the circuit breaker
having the sequence changing device trips and locks out in
response to the permanent fault. The circuit breaker of
the open-loop section closest to the tie recloser, and which
has now been coupled to the fault through the closing of
the tie recloser, trips in response to the fault current con-
dition, remains open a predetermined time interval, and
recloses. Since the circuit breaker having the sequence
changing device is locked out, the line section which it
services is isolated from power while the section adjacent
the tie recloser is coupled to power through the tie re-
closer. Thus, the system is capable of providing singe phase
protection, three-phase protection, location and isolation
of the section containing the permanent fault, and further
permits continuous service to be maintained to at least
75% of the open-loop network. The system operates with
equal success, regardless of the section in which the fault
occurs.

It is, therefore, one object of the instant invention to
provide a multisection open-loop power network combin-
ing the advantages of both single phase and three-phase
circuit interruption.

Another object of the instant invention is to provide
a multisection open-loop power network combining the
features of single phase interruption, three-phase inter-
ruption and further locating and isolating the section con-
taining the fault so as to maintain service to as many sec-
tions of the open-loop network as is possible.

Another object of the instant invention is to provide
a novel multisection open-loop power network combining
the advantages of single phase interruption, multiphase
interruption and means for locating and isolating the sec-
tion containing a permanent fault, and further comprising
a tie recloser servicing the open-loop location for the
purpose of maintaining power to at least 75% of the
open-loop network in the presence of a permanent fault.

Another object of the instant invention is to provide
a novel multisection open-loop power network compris-
ing a tie recloser servicing the open-loop location, and
further comprising recloser circuit interrupters having se-
quence changing devices located intermediate the open-
loop location and the power system source points wherein
the tie recloser and the recloser circuit interrupters hav-
ing sequence changing means operate to isolate only that
section in which the permanent fault has occurred so as
to maintain service to at least 75% of the open-loop net-
work.

These and other objects of the instant invention will be-
come apparent when reading the accompanying descrip-
tion and drawings in which:

FIGURE 1 is a circuit diagram showing a typical open-
loop network coupled to a power line.

FIGURE 2 is a circuit diagram showing an open-loop
power network of the three-phase type designed in ac-
cordance with the principles of the instant invention.

FIGURE 3 is a circuit diagram of a single phase circuit
interrupter of the recloser type, equipped with means for
three-phase lockout.

FIGURE 4 is a circuit diagram showing the electrical
control system for a three-phase system of the type em-
ploying reclosers of the type shown in FIGURE 3.

FIGURE 5 is a wiring diagram of a three-phase lockout system which includes loop automatic sectionalizing system-operated switch means controlled by a sequence changing device.

The concept of the instant invention can best be appreciated from a consideration of the single-line schematic diagram shown in FIGURE 1 which illustrates a representative 46,000 volt line 11. Two switching points $S_1$ and $S_5$ are selectively coupled to line 11 and couple the four open-loop sections A through D to line 11. The two switching points $S_1$ and $S_5$ which emanate from line 11, converge upon a common point where a normally open switch $S_3$ is installed. As can clearly be seen, this arrangement constitutes an open-loop. The open-loop is divided into four sections A through D and any number of lateral load taps 12 can be fed from the open-loop.

As shown in FIGURE 1, the load taps are coupled to their associated sections through transformer means T. The sections A and D are directly coupled to the 46,000 volt line 11 through the normally closed switches $S_1$ and $S_5$. Sections B and C are coupled to the line 11 through series connection with sections A and D, respectively, through the normally closed switches $S_2$ and $S_4$, respectively. If a permanent fault were to occur somewhere in section A, for example, service to 75% of the open-loop may be maintained by opening normally closed switches $S_1$ and $S_2$ and closing normally open switch $S_3$. Thus, sections B through D receive power, while section A is isolated due to the occurrence of the permanent fault.

In a like manner, if a fault occurs in section B, normally closed switch $S_2$ is open, and normally open switch $S_3$ is maintained open so that sections A, C and D receive power, whiel the section B having the permanent fault is isolated from service. Thus, at least 75% of the open-loop network can be maintained in service regardless of which section is hit by a permanent fault.

If the simplified disconnect switches, shown in FIGURE 1, are substituted by automatic circiut interrupters, they can function as single phase interrupters for transient faults, and as three-phase interrupters for permanent faults, and by equipping such interrupters with devices that can discriminate between fault locations and permanently isolate only that one of the four sections within which a permanent fault exists, then a solution for the previous stated problem will have been achieved. FIGURES 2 through 5 disclose circuitry which may be employed for achieving this objective.

FIGURE 2 illustrates a three-phase circuit in detail and consists of an open-loop network 20 in which there are four distinct line sections I through IV, similar to the line sections of FIGURE 1. As shown therein, the power line 11 is coupled to the left and right-hand ends of the open-loop 20 by transformer means $T_1$ and $T_2$. The individual phases of the three-phase network are identified by the designations $\phi A$, $\phi B$ and $\phi C$, respectively. Section I is coupled to the secondary of transformer $T_1$ through single phase automatic circiut reclosers 21A through 21C, respectively, which automatic circuit reclosers are normally in the closed position. Open-loop sections I and II are coupled to one another through single phase automatic circuits reclosers 22A through 22C, respectively. Sections II and III are isolated from one another, but may be tied together through the tie recloser interrupters 23A through 23C which operate in a manner to be more fully described. Sections III and IV are coupled via the reclosers 24A through 24C, respectively, which are similar to the reclosers 22A through 22C, respectively; also section IV is coupled to the secondary of transformer $T_2$ through reclosers 25A through 25C which are substantially similar to the reclosers 21A through 21C, respectively.

The reclosers 21A through 21C and 25A through 25C are designed to trip automatically upon the occurrence of a fault condition in their respective lines, $\phi A$ through $\phi C$, respectively, remain open a predetermined time, and then reclose. If, upon reclosure, the fault current condition persists, these circuit interrupters are then designed to trip, lock out, and simultaneously therewith trip and lock out the single phase circuit interrupters of the remaining two phases.

The tie reclosers 23A through 23C are designed to be normally open. The tie reclosers are coupled to both adjacent sections II and III for the purpose of sensing a loss in power in these sections so as to automatically close across the open-loop location. The tie reclosers 23A through 23C are coupled to section II through current transformer means 26A through 26C, respectively. The tie reclosers are further coupled to the three phases of section III through the current transformers 27A through 27C, respectively.

The single phase automatic circuit reclosers 22A through 22C and 24A through 24C are substantially identical to one another. These reclosers include all of the features and capabilities of the reclosers 21A through 21C and 25A through 25C, and further include one additional feature. The reclosers 22A through 22C are all coupled to common bus 28 which, in turn, is coupled to line $\phi C$ through transformer means 29. Each of the reclosers 22A through 22C is provided with sequence changing means which is operative upon an indication of loss of power in line $\phi C$. The reclosers 22A through 22C are normally operative to trip, remain open, and reclose upon the occurrence of a fault, and, if the fault persists, to then trip and lock out. If the sequence changing device, however, indicates the loss of power in line $\phi C$, the recloser sequence is changed so that, upon the occurrence of a fault condition, the reclosers 22A through 22C will trip and lock out, thereby omititng the normal reclosing cycle, this feature acting to indicate the section in which a fault has occurred and thereby isolating only the section having the fault. In a like manner, the reclosers 24A through 24C are equipped with sequence changing devices which receive a loss of power indication through common bus 30 which is coupled to line $\phi C$ through current transformer 31.

Before the operational sequence of the open-loop circuit 20 is described, the circuit design and operation of the recloser circuit will first be considered.

FIGURE 3 is a schematic diagram of a recloser device 35 which provides single phase protection such as, for example, that provided by any of the reclosers 21A through 21C or 25A through 25C, respectively, and is further provided with means for tripping and locking out the remaining associated reclosers upon the occurrence of a permanent fault condition, which constitutes three-phase protection.

The recloser 35 is comprised of a main circuit conductor which, for example, may be the phase $\phi A$ circuit of the recloser 21A coupled between transformer $T_1$ and open-loop section I. The phase $\phi A$ conductor 36 is inductively coupled to a current transformer 37, and is electrically connected to a stationary contact 38. The opposite (righthand) end of conductor 36 in the phase $\phi A$ circuit is connected in common to one terminal of a varistor 39, and one terminal of an overcurrent solenoid 40. The opposite terminal of solenoid 40 is coupled in common to a conductor 41 which is coupled to one terminal of operating solenoid 42, and is coupled to flexible conductor 43. A second flexible conductor 44 is coupled in common to the opposite terminal of varistor 39, the opposite terminal of operating solenoid 42, and to a conductor 45 which is coupled to stationary contact 46. Stationary contact 46 cooperates with movable contact 47 which is under the control of overcurrent solenoid 40.

The current transformer 37 is coupled to control circuit conductors 48 and 49, which are connected to tripping solenoids of the associated phases, which tripping solenoids are to be more fully described. The current transformer 37 is selectively connected to conductors 48 and 49 by the single pole, double-throw switch 50 and the double pole, single-throw switch 51. The double pole, single-throw microswitch 51 has its two poles 51a and 51b pivotally coupled to arm 51c which is mechanically connected to the movable contact 47 which is under control of the overcurrent solenoid 40. In the normal or dotted line position 51a' and 51b', current transformer 37 is disconnected from control circuit conductors 48 and 49. The pole 51b is connected through conductor 52 to one terminal of spring operated tripping device 53. The remaining terminal of spring operated tripping device 53 is coupled through conductor 48a to the control circuit conductor 48. The pole 50a of microswitch 50, in the solid line position, provides a shunt path across current transformer 37. In its dotted line position 58', one terminal of current transformer 37 is electrically coupled to control circuit conductor 48. The pole 50a is pivotally connected to arm 54 which is movable by means of a cam member 56 of integrator timing mechanism 57, the timing of which is controlled by the current condition in the phase φA line coupled to the integrator timer mechanism by current transformer means 58. The entire circuitry for recloser 35 is contained within a (normally sealed) recloser tank 59 which may be mounted out of doors in any suitable manner.

The operation of the single phase interrupter device of FIGURE 3 is as follows:

Under normal current conditions, the phase φA current passes through conductor 36 (left-hand end), stationary contact 38, movable contact 60, flexible conductor 44, conductor 45 and stationary contact 46, flexible conductor 43, overcurrent solenoid 40 and the opposite (right-hand) end of conductor 36. Upon the occurrence of an overload condition, this is sensed by overcurrent solenoid 40, causing control contact 47 to be moved vertically upward so as to disengage from its stationary contact 47. This diverts current from conductor 45 and passes it through conductor 41, operating solenoid 42, flexible conductor 44, movable contact 60, stationary contact 38 and main circuit conductor 36. With all of the current being diverted away from conductor 45 and through operating solenoid 42, solenoid 42 becomes energized, causing movable contact 60 to be disengaged from its cooperating stationary contact 38, thus interrupting the circuit. The varistor device 39 operates to protect the recloser circuitry from damage due to extremely large surge currents.

The disengagement of movable contact 60 from its stationary contact 38 causes overcurrent solenoid 40 and operating solenoid 42 to become deenergized. This permits the movable control contact 47 and the movable operating contact 60 to return to the engaged position under control of spring biasing means 61 and 62, respectively, thus causing the contacts to reclose after a brief predetermined time interval. If the fault current or overload current condition which has been sensed is of a transient nature, then the circuit will reclose and remain closed. If the condition which has caused the automatic tripping operation to occur is a persistent or permanent fault, the solenoids 40 and 42 will become reenergized and will perform a subsequent tripping operation. The tripping and reclosing operations, in the absence of any additional circuitry, will continue indefinitely. However, the recloser 35 is provided with integrator timing means 57 to control the number of reclosing operations and to further provide a lockout operation. Such timing mechanisms are described in detail in U.S. Patents 2,693,514 and 2,738,394, and for this reason, a detailed description will not be given herein. For purposes of understanding the instant invention, it is sufficient to know that the integrator timing means 57 is provided with timing mechanism (not shown) under control of current transformer means 58 inductively coupled to the main circuit conductor 36. When energized by a suitable overload current condition, the current transformer (or other suitable sensing device) 58 causes the timing mechanism to become operative so as to rotate the eccentric cam 56 in a clockwise direction, as shown by arrow 63. This causes the shoulder 56a of cam member 56 to engage the shoulder 54a of link 54, causing the link 54 to be moved in the downward vertical direction. In the instant invention, the timing mechanism, which is typically adjustable to provide a variety of reclosures, is preferably adjusted so as to permit the reclosure device 35 to perform one reclosing operation and then go to lockout.

For purposes of understanding the operation of the integrator timing mechanism 57, the spring operated mechanism 53 will first be described. The spring operated mechanism 53 is comprised of normally charged spring means 64 which is coupled to the upper end of a link 65 which, in turn, is connected at its lower end to movable contact 60. Link 65 is provided with a notch 65a for receiving a latch 66 operated by solenoid 67. The recloser and lockout operation of device 35 will now be described.

As was previously described, the main circuit current path extends from the left-hand end of conductor 36 to stationary contact 38 through movable contact 60, flexible conductor 44, conductor 45, stationary contact 46, movable control contact 47, flexible conductor 43, overcurrent solenoid 40, and the right-hand end of main (φA) circuit conductor 36. During normal operation, switch 50 has its arm in the solid line position 50a, so as to provide a short circuit across the terminals of current transformer 37. Microswitch 51 has its arms in the closed or solid line positions 51a and 51b, respectively, thus connecting one terminal of the spring operated mechanism 53 from control circuit conductor 49, and connecting one terminal of current transformer 37 from control circuit conductor 49.

Upon the occurrence of an overcurrent condition, overcurrent solenoid 40 is energized to a degree sufficient to overcome the force of spring means 61 so as to disengage movable contact 47 from its cooperating stationary contact 46. In this disengaged position, the current is diverted from conductor 45 to one terminal of operating solenoid 65 and flexible conductor 44 to movable contact 60. This change of the conductive path causes operating solenoid 42 to become energized in order to disengage movable contact 60 from its cooperating stationary contact 38. The disengagement of movable contact 47 from its stationary contact 46 causes link 51c to be moved vertically upward, disconnecting the current paths from control circuit conductor 49 through closed contact 51a to one terminal of current transformer 37 and through closed contact 51b to one terminal of the spring operated mechanism 53. Whereas the fault current condition would be sufficient to cause lockout, since this is the first cycle of operation of the recloser, the timing mechanism 57 has not operated to a degree sufficient to remove the short circuit imposed across current transformer 37 by microswitch 50 so that the spring operated mechanism 53 is prevented from being energized.

Upon disengagement of movable contact 60 from its cooperating stationary contact 38, the solenoids 40 and 42 are deenergized, thereby placing the contacts 47 and 60 again under control of the spring biasing means 61, 62 causing them to be returned to the closed position. Upon reclosure, the arms of microswitch 51 are again moved to the closed or solid line positions. The reclosure of contacts 47 and 60 causes solenoid 40 to become energized so as to disengage movable contact 47 from its cooperating stationary contact 46, and simultaneously therewith to close the arms of microswitch 51. However, during the re-establishment of the main circuit path, the integrator timing mechanism 57 moves an amount sufficient for shoulder 56 of cam 56 to engage the shoulder 54a of link 54 so as to pull link 54 vertically downward and disconnect arm 50a from the shunt circuit path and connect it to control circuit conductor 48 and to one terminal of spring operated mechanism 53. The integrator and timing mechanism performs a dual function. First, it delays the disengagement of contact 47 from 46, and second, it advances the cam 56 to the point of engagement with 54a. Thereafter, contacts 46 and 47 separate. At this time, the terminals of spring operated mechanism 53 are connected across the output terminals of current transformer 37. An inherent characteristic of this operation is the presence of a time interval between the beginning of movement of the movable control contact 47 and the final extinction of the arc in the interruption chamber which contains the movable contact 60 and its cooperating stationary contact 58. During this time interval, power is drawn from the faulted circuit by means of current transformer 37 so as to energize the solenoid 67 of spring operated mechanism 53 in adjacent phases but not phase A, immediately after disconnect of contact 47 from its cooperating stationary contact 46 and before disengagement of contact 60 from its cooperating contact 38 under control of the operating solenoid 42. Phase A is disconnected to minimize the energy required from 37. Fault current trips phase A open.

The time interval which is due largely to the inertial forces involved in moving the contacts 47 and 60, will decrease with higher fault current because of the higher electromagnetic forces developed by their operating solenoids 40 and 42, respectively. However, during higher fault currents, more power is available from the faulted circuit to operate the spring operating mechanism 53 by means of current transformer 37 so as to counteract disadvantage of the shorter interrupting time interval. The spring means 64 of spring operated mechanism 53 has a biasing strength greater than the strength of bias means 62 so as to maintain movable contact 60 in the disengaged condition, thereby resulting in lockout of the recloser device 35.

Therefore, prior to the operation of the arms of microswitch 51 to the open position and subsequent to the movement of the arm of microswitch 50 to its solid line position, current transformer 37 is coupled to the spring operated mechanisms of the associated single phase recloser devices, for example, devices 21b and 21c, as represented by the dotted lines 48–49 of FIGURE 2. However, since the reclosers have closed upon a circuit in which the transient fault has cleared, no operation of the spring actuated device 57 will occur. Thus, summarizing the operation, upon the occurrence of a fault condition in any one of the three phases, the single phase recloser device runs through a recloser cycle consisting of automatic tripping, remaining open for a brief time interval, and reclosing to allow an interval for a transient fault to be cleared. Since the fault has been cleared, normal operation will be maintained and the integrator timing mechanism 57 of the phase hit by the fault condition will be automatically reset.

If the fault current condition persists, after the reclosing cycle, the recloser of the phase hit by the fault will trip and lock out and simultaneously therewith will automatically lockout the associated reclosers of the remaining two phases so as to provide both single phase and three-phase interruption protection.

FIGURE 4 shows the electrical circuitry and the manner of interconnection between three single phase interrupters such as, for example, the interrupters 21a through 21c. It should be noted that like elements in FIGURES 3 and 4 are designated with like numerals.

The reclosers of the three phases are provided with current transformers 37A through 37C, respectively, which are inductively coupled to the circuits $\phi A$ and $\phi B$ and $\phi C$, respectively. Lockout operation will now be considered with reference to the $\phi B$ phase of the three-phase circuit. Under normal operation, microswitch 50B has its arms in the solid line position 50b, and microswitch 51B has its arms in the solid line (closed) positions 51b and 51a. When a fault current condition is sensed, the overcurrent solenoid 40 for the phase $\phi B$ recloser 21B moves the arms of microswitch 51B to the dotted line position when timer 57 releases them. However, at this time, a shunt path is established across the output of current transformer 37B by microswitch 50B to prevent current transformer 37B from being coupled to any of the solenoids 67A through 67C of the timing mechanisms. The recloser will then trip, remain open a brief interval of time, and reclose. If the recloser 21B closes in on a permanent fault, a second tripping operation will occur, causing microswitch 51B to move its arms to the dotted line positions. The integrator timing mechanism 50B moves to the dotted line position 50b' removing the short circuit from current transformer 37B. Thus, the solenoid 67B of the spring operated mechanism for phase $\phi A$ and $\phi C$ directly coupled to the output of current transformer 37B through the control circuit conductors 48 and 49 that couple the solenoids 67A and 67C across the output terminals of current transformer 37B, causing the spring operated mechanisms to open their associated movable contacts 60 to the lockout position. Any one phase is operated to lockout in normal manner while simultaneously connecting its current transformer to the solenoids of the other two phases. The mechanisms of the other phases thus open them in the manner described.

Returning to FIGURE 2, the single phase-three phase interrupters 21A–21C and 25A–25C are equipped with reclosers of the type shown in FIGURES 3 and 4.

The tie reclosers 23A–23C are equipped with recloser devices of the type described in U.S. Patents 3,152,284, 3,152,285 and 3,152,286, respectively. In all of the above mentioned U.S. patents, FIGURES 5 and 5a show the detailed embodiments of tie recloser circuits. For the purpose of understanding the instant invention, however, only a brief description will be given herein. Considering tie recloser interrupter 23A, for example, it can be seen that the interrupter is coupled to open-loop sections II and III by means of current transformers 26A and 27A, respectively. Upon the occurrence of a loss of service to the $\phi A$ line, transformer 26A becomes deenergized to operate the tie recloser circuitry to establish an electrical connection between loop sections II and III. In a like manner, when tie recloser 23A is in the open position and current transformer 27A senses a loss of service to open loop section III, this operates the tie recloser mechanism to establish a connection between sections II and III.

FIGURE 5 shows an alternative arrangement 70 which is modified from the arrangement shown in FIGURE 4 to provide the remainder of the loop automatic sectionalizing system characteristics in a manner to be more fully described. Considering FIGURE 2 for a moment, the reclosers 22A through 22C and 24A through 24C are designed in accordance with the circuitry shown in FIGURE 5. It should be further noted that like elements as seen in FIGURES 2, 4 and 5 are designated with like numerals. The phase recloser 35 (see FIGURE 3) is provided with a current transformer 37A through 37C. The microswitches 51A through 51C provided in this alternative embodiment are designed so that their normally closed position coincides with the control contact 47 being in engagement with its cooperating stationary contact 46 (see FIGURE 3). The microswitch 50A' in FIGURE 5 is comprised of first and second switch arms 50a and 50b with the normal position being the solid line position and the integrator timed-out position being the dotted line positions 50a' and 50b', respectively. Each of the reclosers are further provided with sequence changing devices 74A through 74C which are all electrically connected in parallel by means of the circuit conductors 28 which are energized by the current transformer 29 in the same manner as shown in FIGURE 2. The sequence changing devices are described in detail in the above mentioned U.S. Patents 3,152,284, 3,152,285 and 3,152,286, and are shown best in FIGURES 4 and 4a of the above mentioned patents. For purposes of understanding the instant invention, it is sufficient to appreciate that the sequence changing devices 74A through 74C operate by sensing a loss of service to the main circuit conductor φC in order to operate the switch arms 72A–72C and 73A–73C of the microswitches 71A–71C respectively, from the solid line positions to the dotted line positions 72A'–72C' through 73A'–73C', respectively. This sequence change causes the reclosing cycle to be prevented from occurring and causing the breakers to operate to trip and lock out immediately, in a manner to be more fully described.

The operation of the recloser devices 22A–22C and 24A–24C will now be described in accordance with the circuitry 70 of FIGURE 5:

For purposes of explaining the operation, a fault current will be assumed to exist in the φB circuit. It should be understood that a fault current occurring in any of the remaining phases φA and φC will result in similar operations.

Upon the occurrence of a fault current condition, the overload solenoid 40 (see FIGURE 3) for the φB circuit will become energized, causing the normally closed contacts of switch 51B to open. This operation removes one short circuit from current transformer 37B and disconnects the spring operated tripping mechanism solenoid 67B from the control circuit conductor 49. The operation of overcurrent solenoid 40 (see FIGURE 3) causes current to be diverted from conductor 45 through operating solenoid 42 to disconnect the main circuit conductor 36 from service. This deenergizes solenoids 40 and 42, causing reclosure of their movable contacts 47 and 60 after a very brief time interval. It should be noted that the associated integrator timing mechanism 57 for the φB circuit begins to time out as soon as the fault current condition is sensed by its current transformer 58. If the recloser closes in on a persistent fault condition, the integrator timing mechanism moves the arms of microswitch 50B' to the dotted line positions 50a' and 50b', respectively. This will occur after the first reclosing operation. As soon as reclosure occurs, current transformer 37B has one of its terminals coupled through switch arm 50a' and control circuit conductor 48 to the tripping mechanism solenoids 67A–67C, respectively. The other switch arm 50b' of microswitch 50B' moves the short circuit from current transformer 37B. If the overload current condition is still on the line, two tripping mechanism solenoids 67A and 67C are energized, causing their associated spring operated mechanisms to open their associated movable contact 60 to the disengaged position and locking them out. Simultaneously, 67B is opened by the fault current. Thus, the operation is substantially similar to that described with reference to FIGURES 3 and 4.

During normal operation, the switch arms of microswitch 71B are in the solid line positions 72B and 73B, respectively. Let it now be assumed that at least the main circuit for the phase φC has been interrupted. This causes the current transformer 29 to become deenergized so as to simultaneously operate all of the sequence changing devices 74A–74C which, in turn, operate their microswitches 71A–71C, respectively, to the dotted line positions. Considering the microswitch 71B, its switch arms are moved to the dotted line positions 72B' and 73B' so as to electrically connect the upper terminal of current transformer 37B to control circuit conductor 48 and so as to remove one of the short circuits from current transformer 37B. If service is now restored to the circuit and a fault current persists upon restoration of service and recloser as phase B opens, current transformer 37B is simultaneously electrically connected to all of the spring actuated mechanism solenoids 67A–67C, causing their associated recloser devices to be tripped and to lock out. Thus, summarizing the operation, the sequence changing devices function to cut out the recloser cycle, causing the recloser devices to automatically trip and lock out.

Returning to a consideration of FIGURE 2, the manner in which single phase and three-phase operation, combined with the loop automatic sectionalizing system scheme operation will now be given.

Let it be assumed that a permanent single-phase fault occurs in the main circuit line φC of section I in the open-loop network 20.

Recloser interrupter 21C, sensing this fault condition, trips instantly, remains open a predetermined time interval, and then recloses. Due to the fact that the fault is a persistent one, the recloser 21C opens a second time, and then locks out. Simultaneously, with the second opening and lockout of recloser 21C, reclosers 21A and 21B are opened and locked out as a result of the three-phase lockout function provided through the circuitry of FIGURE 4.

A predetermined time after fault initiation and at the time recloser 21C first opens, current transformer 29, connected to main circuit φC of section I, actuates the sequence changing devices 74A–74C (see FIGURE 5) to alter their operation so that the reclosers 22A–22C will lock out after the first trip, i.e., they will omit the first reclosing cycle and go immediately to lockout upon sensing a fault condition. If the fault current condition had been on either the φA or φB line, the sequence changing operation would begin after lockout of all of the recloser units 21A–21C since the current transformer 29 is coupled only to the line φC.

The sequence changing device of recloser 22C, following the first tripping operation of recloser 21C, operates the microswitch 71C to coordinate three-phase lockout to function with the first opening of recloser 22C instead of its second opening, which would be the normal sequence followed.

A predetermined time after fault initiation and substantially simultaneously with the first tripping operation of recloser 21C, tie recloser 23C senses the loss of service to section II through current transformer 26C so as to close tie recloser 23C establishing a current path between sections II and III. Upon tripping and lockout of reclosers 21A and 21B, tie reclosers 23A and 23B sense the loss of service to section II through current transformers 26A and 26B, respectively, so as to operate the tie reclosers closed in order to establish connection between sections II and III.

Since reclosers 21A to 21C have gone to lockout, sections I and II are momentarily disconnected from service. Upon closing of the tie reclosers 23A–23C, service is now restored to sections I and II. With reclosers 21A–21C, having gone to lockout, section I is now protected only by the reclosers 22A–22C. Since the fault is a persistent one, the line φC operates recloser 22C to trip and lock out. The lock-out operation automatically triggers tripping and lockout of the reclosers 22A and 22B in the same manner as was previously described with reference to FIGURES 3 and 4.

The reclosers 24A through 24C, which are normally insensitive to a fault in section I due to tie reclosers 23A through 23C normally being open, now become sensitive to a fault current condition through the connections established across the open-loop location. Since the fault appears in the φC line, recloser 24C automatically trips, remains open for a brief time interval, and recloses. Since the reclosers 22A through 22C have gone to lockout, recloser 24C will remain closed after the reclosing cycle, thus maintaining service to sections II through IV, with only section I being isolated from the power source line 11 (connected through transformer $T_1$).

If, when the tie reclosers 23A through 23C are operated closed, the lockout cycle of reclosers 22A through 22C is completed before the reclosing cycle of recloser 24C, the action will be the same as above, except that the second momentary interruption of sections II and III will not occur, since recloser 24C will not have had time to trip and will, therefore, automatically remain biased in the closed position under control of the movable contact biasing spring 62 (see FIGURE 3).

Let it now be assumed that a permanent single phase fault occurs in the line φC of section II.

This fault current condition will be sensed to recloser 22C, causing it to trip instantly, typically ahead of recloser 21C, which will also sense the fault current condition. The recloser 22C will then run through a reclosing cycle of instantly tripping, remaining open a brief time interval, and reclosing. The fault current condition will prevail for a sufficient period of time to permit recloser 21C to trip open instantly (slightly after closing of recloser 22C). Recloser 21C will also go through a reclosing cycle consisting of an instant trip, remaining open for a very brief time interval, and a reclosing. The reclosing of recloser 21C returns service to line φC, causing recloser 22C to sense the fault current condition and to trip and lock out (under control of its integrator timing mechanism 57, shown in FIGURE 3). The tripping and lockout of recloser 22C automatically trips and locks reclosers 22A and 22B by means of the circuitry shown in FIGURE 4, previously described.

The current transformer 26C of tie recloser 23C detects the loss of service to line φC upon the first tripping operation of recloser 22C, causing it to close and establishing a connection between sections II and III. The current transformers 26A anh 26B sense a loss of service to lines φA and φB upon tripping and lockout of reclosers 22A and 22B so as to operate their tie reclosers 23A and 23B, respectively, to the closed position to establish electrical connections between lines φA and φB of sections II and III.

Reclosers 24A through 24C, which are normally insensitive to a fault current condition in section II, now become sensitive to such fault current conditions with the closing of tie reclosers 23A through 23C. Recloser 24C senses the fault current condition in line φC, causing recloser 24C to trip, remain open for a brief time interval, and reclose. Since a current path is now established through sections II, III and IV to transformer T₂, the fault current condition is now sensed by tie recloser 23C, causing it to trip and lock out. The lockout condition simultaneously trips and locks out tie reclosers 23A and 23B through circuitry of the type shown in FIGURE 4. Thus tie reclosers 23A through 23C will now be open, and reclosers 22A through 22C will be open, while the remaining reclosers 21A through 21C, 24A through 24C and 25A through 25C will be closed so that sections I, III and IV will be serviced, while section II will be isolated from all three phases in order that service may continue to 75% of the section.

In the case where a permanent single phase fault occurs in line φC of section III, the circuit behavior will be similar to that described for the occurrence of a permanent fault in line φC of section II. All three phases of section III will be isolated and service will continue to the remaining 75% of the line.

In the case of a permanent single phase fault occurring in line φC of section IV, the circuit behavior will be similar to that described for the occurrence of a permanent fault in line φC of section I. All three phases of section IV will be isolated and service will continue to the remaining 75% of the line.

If any one of the above identified fault locations experiences what is commonly referred to as a "transient fault," at least one recloser between the fault and source of power will open instantly. This opening action will permit clearing of the fault and the recloser which is operated will reclose after a predetermined brief time interval. After the reclosing operation, the recloser timer and integrator will reset, the sequence changing devices will reset, and the entire system will be ready to function and coordinate on a subsequent fault of either the transient or permanent type. Only one single phase line of the faulted section will have been momentarily disturbed.

In the case of a phase-to-phase or a three-phase fault, the protective equipment of each phase will function independently. The recloser devices need not act in unison. The first recloser to send a three-phase lockout signal to its associated two reclosers for the remaining two phases will cause its two corresponding reclosers to open and lock out, regardless of where they have advanced to in the sectionalizing program at that instant.

It can, therefore, be seen that the instant invention provides a novel open-loop power network comprised preferably of four selectively coupled sections in which both single phase and three-phase operation is provided through the provision of sequence changing devices. The section in which the fault has occurred is detected immediately, and that section is isolated from service while the remaining 75% of the sections remain in service. Some advantages of the instant invention are:

(1) The protective system described is applicable to any voltage system which presently use, or can be adapted to use, single phase reclosers. Presently available reclosers have ratings of up to 46 kv.

(2) Only one open-loop network is temporarily disturbed by a transient fault condition.

(3) Only one-quarter of the total open loop network experiences an extended outage in the case of a permanent fault.

(4) The exceptionally fast instantaneous circuit interruptions inherent in automatic circuit reclosers minimize line and equipment damage.

(5) There is an appreciable cost savings because separate relay apparatus is not required, and because the types of interrupters utilized are less expensive than conventional circuit breakers.

(6) No pilot wires or carrier current equipment is required for performing reverse current relaying operations or distant relaying operations, which two expensive and complex techniques are conventionally employed to achieve the results of the instant invention.

Although this invention has been described with respect to its preferred embodiments, it should be understood that many variations and modifications will now be obvious to those skilled in the art, and it is preferred therefore, that the scope of the invention be limited not by the specific disclosure herein, but only by the appended claims.

What is claimed is:

1. A multiphase open-loop power system comprising a power source having at least a first connecting point; first, second, third and fourth network sections;

first recloser means connected between said first connecting point and said first section;

second recloser means connected between said first connecting point and said fourth section;

third recloser means connected between said first and second sections;

fourth recloser means connected between said third and fourth sections;

tie recloser means positioned between said second and third sections and being normally open;

said tie recloser means including means for sensing the loss of power in either said second or third network to electrically connect said second and third sections;

said first, second, third and fourth recloser means each being comprised of a single phase recloser connected to an associated phase of said system, and lockout means coupling the single phase reclosers of each recloser means for tripping and locking out said recloser means upon the occurrence of a permanent fault;

said third and fourth recloser means each including sequence changing means coupled to said lockout means for sensing the absence of power to its associated section to omit the reclosure operation of its associated single phase reclosers thereby causing its associated reclosers to trip and lock out.

2. The system of claim 1 wherein the inputs of said sequence changing means associated with said third recloser means are connected to a first common terminal;

first current sensing means being inductively coupled with one phase of said system and said first common terminal.

3. The system of claim 2 wherein the inputs of said sequence changing means associated with said fourth recloser means are connected to a second common terminal;

second current sensing means being inductively coupled with one phase of said system and said second common terminal.

4. The system of claim 1 wherein said single phase reclosers are each comprised of a first pair of normally closed cooperating contacts, first coil means for operating said first pair of contacts to the open position;

a second pair of normally closed cooperating contacts for diverting current from said first coil means;

second coil means sensitive to an overcurrent condition in its associated phase for opening said second pair of contacts to pass current through said first coil means for opening said first pair of cooperating contacts;

bias means for reclosing said first and second pair of contacts when a predetermined time interval after said first pair of cooperating contacts has opened.

5. The system of claim 4 wherein said lockout means is comprised of spring actuated lockout devices coupled to each of said first pairs of contacts and having first and second input terminals;

current transformer means each being inductively coupled to an associated phase;

a first control conductor having a first terminal coupled in common to one input of the lockout devices of one recloser means and having a second terminal connected in common to one terminal of said current transformer means;

switch means each establishing a short circuit path across an associated current transformer means;

timing means sensitive to an overload condition in its associated phase for disconnecting its associated switch means from said short circuit condition and coupling said switch means between the second terminal of its associated current transformer means and the second input of all of the lockout devices associated with one recloser means to operate the recloser means to lock out.

6. The system of claim 5 wherein the sequence changing devices are further comprised of switch means each being coupled in an associated lockout means for normally short circuiting each current transformer means through a second short circuit path.

7. The system of claim 6 wherein said sequence changing devices are further comprised of means responsive to an absence of power for disconnecting said second short circuit path and connecting said second switch means between the second terminal of its associated current transformer means and the second input terminals of all of the spring actuated mechanisms of its associated recloser means for operating the recloser means to lock out immediately upon the sensing of a fault condition.

8. The system of claim 7 wherein each of said lockout means is further comprised of third switch means normally coupling one input of said spring operated devices to one terminal of the current transformers associated therewith and operative under control of an associated second pair of cooperating contacts for opening said third switch means.

References Cited
UNITED STATES PATENTS

| | | | |
|---|---|---|---|
| 2,383,327 | 8/1945 | Ludwig et al. | 317—25 X |
| 2,525,527 | 10/1950 | Dannenberg | 317—25 |
| 2,776,393 | 1/1957 | Easley et al. | 317—25 |
| 3,309,572 | 3/1967 | Riebs | 317—22 |
| 3,152,284 | 10/1964 | Pulsford | 317—25 X |
| 3,234,397 | 2/1966 | Park | 307—86 |

MILTON O. HIRSHFIELD, *Primary Examiner.*

R. V. LUPO, *Assistant Examiner.*